US009893515B2

(12) United States Patent
Arioka et al.

(10) Patent No.: US 9,893,515 B2
(45) Date of Patent: Feb. 13, 2018

(54) POWER SWITCHGEAR HAVING SURGE SUPPRESSION APPARATUS

(71) Applicant: Mitsubishi Electric Corporation, Chiyoda-ku (JP)

(72) Inventors: Masahiro Arioka, Chiyoda-ku (JP); Naoki Tanaka, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 346 days.

(21) Appl. No.: 14/416,488

(22) PCT Filed: Apr. 15, 2013

(86) PCT No.: PCT/JP2013/061180
§ 371 (c)(1),
(2) Date: Jan. 22, 2015

(87) PCT Pub. No.: WO2014/050184
PCT Pub. Date: Apr. 3, 2014

(65) Prior Publication Data
US 2015/0180224 A1 Jun. 25, 2015

(30) Foreign Application Priority Data
Sep. 26, 2012 (JP) .................... 2012-211717

(51) Int. Cl.
*H02H 3/22* (2006.01)
*H02H 7/22* (2006.01)
(Continued)

(52) U.S. Cl.
CPC .......... *H02H 7/222* (2013.01); *H01H 33/161* (2013.01); *H02H 9/02* (2013.01); *H01C 7/126* (2013.01)

(58) Field of Classification Search
CPC .............. H01H 33/565; H01H 33/161; H01F 2017/0093; H02H 1/04; H02H 3/20;
(Continued)

(56) References Cited

U.S. PATENT DOCUMENTS 4,215,256 A * 7/1980 Sakaguchi ............. H01H 31/32
218/82
4,477,692 A * 10/1984 Brealey .................. H01B 17/26
174/142
(Continued)

FOREIGN PATENT DOCUMENTS

JP 8-265925 A 10/1996
JP 2006-94636 A 4/2006
(Continued)

OTHER PUBLICATIONS

International Search Report (PCT/ISA/210) dated May 14, 2013, by the Japanese Patent Office as the International Searching Authority for International Application No. PCT/JP2013/061180.
(Continued)

*Primary Examiner* — Daniel Kessie
(74) *Attorney, Agent, or Firm* — Buchanan Ingersoll & Rooney PC

(57) ABSTRACT

A power switchgear includes: a vacuum switch tube in a ground tank; a movable side conductor which passes through the ground tank to connect to one side of the vacuum switch tube, and extends to the upper side of the tank; a fixed side conductor which passes through the ground tank and connects to another side of the vacuum switch tube, and extends to the upper side of the tank. A conical insulator is placed on an opening of the ground tank, and a tip end is inserted in the ground tank; an insulation cylinder is placed at a rear end of the conical insulator to cover the inside of a concave portion of the conical insulator, and protrudes outside the ground tank; and a surge suppres-
(Continued)

sion apparatus inside the insulation cylinder has a terminal in the conical insulator and connected to a main circuit of the vacuum switch tube.

5 Claims, 5 Drawing Sheets

(51) Int. Cl.
  *H01H 33/16* (2006.01)
  *H02H 9/02* (2006.01)
  *H01C 7/12* (2006.01)
(58) Field of Classification Search
  CPC . H02H 3/22; H02H 7/222; H02H 9/02; H01C 7/126
  USPC .......... 218/13, 7, 4, 154; 361/118, 601–604; 318/400.21; 335/157
  See application file for complete search history.

(56) References Cited

U.S. PATENT DOCUMENTS

| | | | | |
|---|---|---|---|---|
| 6,255,589 B1 * | 7/2001 | Starck | .................. | H01B 17/301 174/142 |
| 6,346,677 B1 * | 2/2002 | Guillemette | ........... | H01B 17/26 174/142 |
| 6,545,241 B1 * | 4/2003 | Franchi | ................ | H02B 13/035 218/154 |
| 6,573,469 B1 * | 6/2003 | Piazza | .................. | H02B 13/035 218/12 |
| 6,683,267 B1 * | 1/2004 | Piazza | .................. | H02B 13/035 218/2 |
| 7,511,243 B2 * | 3/2009 | Laskowski | ........... | H02B 13/035 218/14 |
| 2002/0012225 A1 * | 1/2002 | Matsushita | .............. | H02B 5/06 361/605 |
| 2002/0056704 A1 * | 5/2002 | Furuta | ...................... | H02B 5/06 218/13 |
| 2010/0200274 A1 * | 8/2010 | Jonsson | .................. | B29C 70/58 174/137 B |

FOREIGN PATENT DOCUMENTS

| | | |
|---|---|---|
| JP | 2006-165436 A | 6/2006 |
| JP | 2009-261111 A | 11/2009 |
| JP | 2009261111 A * | 11/2009 |

OTHER PUBLICATIONS

Notification of Reason for Refusal dated Nov. 18, 2014 for Application No. JP 2014-538216 with English Translation.

* cited by examiner

POWER SWITCHGEAR HAVING SURGE SUPPRESSION APPARATUS

TECHNICAL FIELD

The present invention relates to a power switchgear and relates to a power switchgear in which a surge suppression apparatus such as a lightning arrester is attached in a ground tank so as to be capable of being connected to and separated from a main circuit portion of the power switchgear.

BACKGROUND ART

Hitherto, there has been known that a power switchgear performs current interruption in a vacuum having excellent interruption performance; and thus, chopping phenomena, which interrupt current when a current value of a circuit decreases to several amperes, are generated and accordingly a switching surge several times as large as circuit voltage is generated due to the chopping phenomena.

Accordingly, in the case where an apparatus, in which there is a concern of insulation deterioration and/or dielectric breakdown due to the switching surge of the power switchgear, is used in a power system, a surge suppression apparatus such as a lightning arrester or a surge absorber is placed between the power switchgear and the electric power apparatus. However, the surge suppression apparatus needs to be placed while securing a sufficient insulation distance to other facility; and accordingly, a problem is that an area of a substation or the like is increased and, in a substation without having a sufficient area, the surge suppression apparatus cannot be placed and thus a problem also exists in that the power switchgear is not adopted.

PRIOR ART DOCUMENT

Patent Document

Patent Document 1: Japanese Unexamined Patent Publication No. 2006-94636

Patent Document 2: Japanese Unexamined Patent Publication No. 2006-165436

SUMMARY OF THE INVENTION

Problems to be Solved by the Invention

In the above-described conventional power switchgear, a problem exists in that there are generated: acceleration of insulation deterioration of an electric power apparatus such as a transformer, a reactor, and a cable, placed in the power system to which the power switchgear is connected; and dielectric breakdown in the electric power apparatus in the worst case.

Furthermore, in the case where the apparatus, in which there is the concern of insulation deterioration and/or dielectric breakdown due to the switching surge of the power switchgear, is used in the power system, the surge suppression apparatus such as the lightning arrester or the surge absorber is placed between the power switchgear and the electric power apparatus. However, the surge suppression apparatus needs to be placed while securing the sufficient insulation distance to other facility; and accordingly, the problem is that the area of the substation or the like is increased and, in the substation without the sufficient area, the surge suppression apparatus cannot be placed and thus the problem also exists in that the power switchgear is not adopted.

The present invention has been made to solve the above-mentioned problem, and an object of the present invention is to provide a power switchgear in which an occupation space of a single power switchgear is not increased, a surge suppression apparatus is provided to prevent malfunction due to a surge of a self-apparatus and other apparatus, and insulation deterioration due to surge voltage is suppressed.

Means for Solving the Problems

According to the present invention, there is provided a power switchgear including: a ground tank whose axial direction is set horizontally; a vacuum switch tube horizontally placed in the ground tank and connected to an operating mechanism; a movable side insulation supporter placed in the ground tank and supported by the ground tank to support the movable side of the vacuum switch tube; a fixed side insulation supporter placed in the ground tank and supported by the ground tank to support the fixed side of the vacuum switch tube; a movable side center conductor in which one side passes through a wall portion of the ground tank and is connected to the movable side of the vacuum switch tube, and the other side is placed to be extended to the upper side of the ground tank through the inside of a movable side insulator; and a fixed side center conductor in which one side passes through a wall portion of the ground tank and is connected to the fixed side of the vacuum switch tube, and the other side is placed to be extended to the upper side of the ground tank through the inside of a fixed side insulator. The power switchgear includes: a conical shaped insulator which is placed on an opening portion provided at a part of the ground tank, and whose tip end portion is inserted in the ground tank; an insulation cylinder which is placed at a rear end portion of the conical shaped insulator so as to cover the inside of a conical concave portion of the conical shaped insulator, and protrudes to the outside of the ground tank; and a surge suppression apparatus which is placed inside the insulation cylinder while maintaining hermetic seal, and whose main circuit side terminal is placed in the conical shaped insulator and the main circuit side terminal is connected to a main circuit of said vacuum switch tube, the surge suppression apparatus being placed on the lower side or the lateral side of the ground tank.

Furthermore, according to the present invention, there is provided a power switchgear including: a ground tank whose axial direction is set horizontally; a vacuum switch tube horizontally placed in the ground tank and connected to an operating mechanism unit; a movable side insulation supporter placed in the ground tank and supported by the ground tank to support the movable side of the vacuum switch tube; a fixed side insulation supporter placed in the ground tank and supported by the ground tank to support the fixed side of the vacuum switch tube; a movable side center conductor in which one side passes through a wall portion of the ground tank and is connected to the movable side of the vacuum switch tube, and the other side is placed to be extended to the upper side of the ground tank through the inside of a movable side insulator; and a fixed side center conductor in which one side passes through a wall portion of the ground tank and is connected to the fixed side of the vacuum switch tube, and the other side is placed to be extended to the upper side of the ground tank through the inside of a fixed side insulator. The power switchgear includes: an insulation cylinder which is placed on an opening portion provided at a part of the ground tank, and protrudes to the outside of the ground tank; a surge suppression apparatus which is placed inside the insulation cylinder while maintaining hermetic seal, and whose main circuit side terminal is placed inside the ground tank and the main circuit side terminal is connected to a main circuit of the vacuum switch tube; a contactor which is placed on the main circuit side of the vacuum switch tube, and is brought into contact with the main circuit side terminal of the surge suppression apparatus; a slide seal shaft placed on an outer circumferential portion of a grounding side terminal of the surge suppression apparatus; and a slide seal case which is placed on the insulation cylinder, and through which the slide seal shaft is passed through, the surge suppression apparatus being placed on the lower side or the lateral side of the ground tank.

Advantageous Effect of the Invention

According to the power switchgear of the present invention, even when the surge suppression apparatus is needed for protecting the power switchgear from a switching surge, there exists an effect that, for example, a placing space does not need to be differently secured for placing the surge suppression apparatus.

MODE FOR CARRYING OUT THE INVENTION

Embodiment 1

Figure 1:
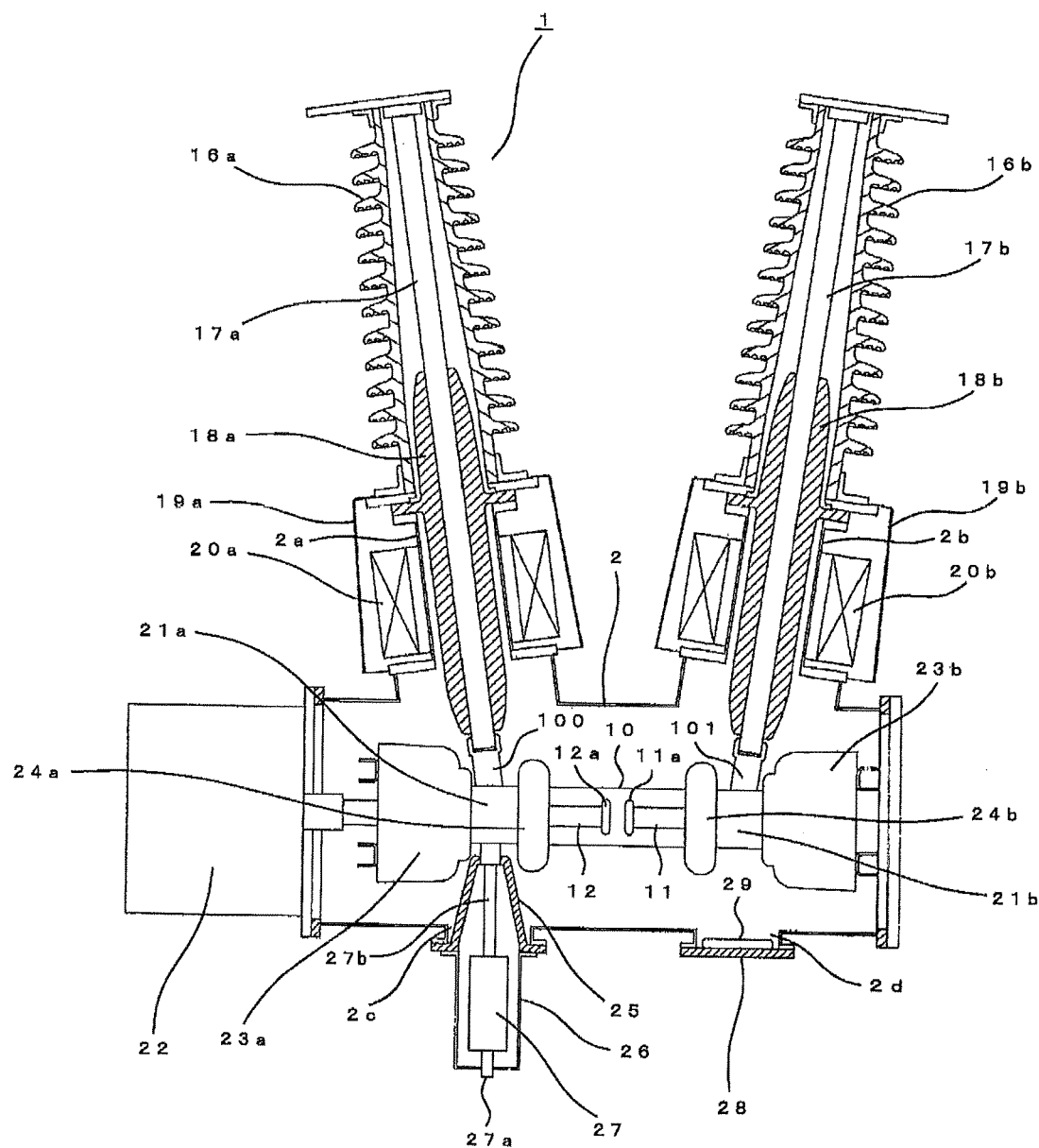
FIG. 1 is a sectional view showing a power switchgear according to Embodiment 1 of the present invention.

Hereinafter, Embodiment 1 of the present invention will be described with reference to FIG. 1 and FIG. 2. Then, in each of the drawings, identical or equivalent members and portions will be described with the same reference numerals assigned thereto.

Reference numeral 1 denotes a power switchgear such as a vacuum circuit breaker. An electrically grounded cylindrical ground tank 2 is placed such that the axial direction thereof is set horizontally; and a movable side terminal drawing outlet 2a and a fixed side terminal drawing outlet 2b are formed on the upper side of axial both end portions in a substantially radial direction, respectively. Furthermore, an opening portion 2c and an opening portion 2d are formed, for example, on the lower side of axial both end portions of the ground tank 2, respectively. Incidentally, insulating gas such as dry air, nitrogen, carbon dioxide, and sulfur hexafluoride (SF6) gas is sealed under a high pressure in the ground tank 2 as insulating gas.

A movable side insulator 16a is hermetically attached in an extension portion of the movable side terminal drawing outlet 2a of the ground tank 2 via a movable side compartment bushing 18a; and a movable side current transformer 20a is placed around the extension portion of the movable side terminal drawing outlet 2a and a movable side current transformer cover 19a is attached so as to cover the movable side current transformer 20a.

Furthermore, a fixed side insulator 16b is hermetically attached in an extension portion of the fixed side terminal drawing outlet 2b via a fixed side compartment bushing 18b; and a fixed side current transformer 20b is placed around the extension portion of the fixed side terminal drawing outlet 2b and a fixed side current transformer cover 19b is attached so as to cover the fixed side current transformer 20b.

A vacuum switch tube 10, which is horizontally placed in the ground tank 2 and is operably coupled to an operating mechanism unit 22, is composed of: a tubular shaped insulation cylinder made of insulation material such as ceramic; a fixed contact side conductor 11 which is contained in the insulation cylinder and retains a fixed contact 11a at one end; and a movable contact side conductor 12 which is disposed to be capable of connecting t041o and separating from the fixed contact side conductor 11 and retains a movable contact 12a at one end.

The operating mechanism unit 22, in which the fixed contact 11a and the movable contact 12a are connected and separated to be closed and opened, is provided at the outside of the ground tank 2. The operating mechanism unit 22 moves the movable contact side conductor 12 in the horizontal direction, and thus, the movable contact 12a is connected to and separated from the fixed contact 11a to close and open a main circuit of the power switchgear.

A movable side insulation shield 24a and a fixed side insulation shield 24b are provided on both ends of the vacuum switch tube 10 so as to surround the outer circumference of both end portions of the vacuum switch tube 10. Then, there are provided a movable side insulation supporter 23a which is placed in the ground tank 2 and supported by the ground tank 2 to support the movable side of the vacuum switch tube 10 and a fixed side insulation supporter 23b which is placed in the ground tank 2 and supported by the ground tank 2 to support the fixed side of the vacuum switch tube 10.

Furthermore, the movable contact side conductor 12 of the vacuum switch tube 10 is placed in a movable side connection conductor 21a; and the movable contact side conductor 12 and an end portion of a movable side center conductor 17a of the movable side compartment bushing 18a are connected by a movable side link conductor 100. The fixed contact side conductor 11 of the vacuum switch tube 10 is placed in a fixed side connection conductor 21b; and the fixed contact side conductor 11 and an end portion of a fixed side center conductor 17b of the fixed side compartment bushing 18b are connected by a fixed side link conductor 101.

The movable side center conductor 17a in the inside of the movable side insulator 16a is connected to the movable side link conductor 100 of the vacuum switch tube 10; and the fixed side center conductor 17b in the inside of the fixed side insulator 16b is connected to the fixed side link conductor 101 of the vacuum switch tube 10.

One side of the movable side link conductor 100 passes through the movable side insulation shield 24a and is connected to the movable side of the vacuum switch tube 10; and one side of the fixed side link conductor 101 passes through the fixed side insulation shield 24b and is connected to the fixed side of the vacuum switch tube 10.

The other side of the movable contact side conductor 12 is slidably supported to the ground tank 2 by the movable side insulation supporter 23a in an electrically insulated state; and the other side of the fixed contact side conductor 11 is fixed to the ground tank 2 by the fixed side insulation supporter 23b in an electrically insulated state.

Furthermore, the opening portion 2c and the opening portion 2d are provided in a radial direction with respect to the ground tank 2, for example, near the lower side of either one of the movable side connection conductor 21a or the fixed side connection conductor 21b of the vacuum switch tube 10, or both of the movable side connection conductor 21a and the fixed side connection conductor 21b; and a conical shaped insulator 25 disposed so as to protrude into the ground tank 2 is attached by insertion on, for example, the opening portion 2c. In addition, an insulation cylinder 26 is hermetically attached to a lower portion of the conical shaped insulator 25. A surge suppression apparatus 27 such as a lightning arrester or a surge absorber, which is attachably and detachably placed while maintaining hermetic seal to the ground tank 2 and the outside of the power switchgear, is attached in the conical shaped insulator 25 and the insulation cylinder 26.

Figure 2:
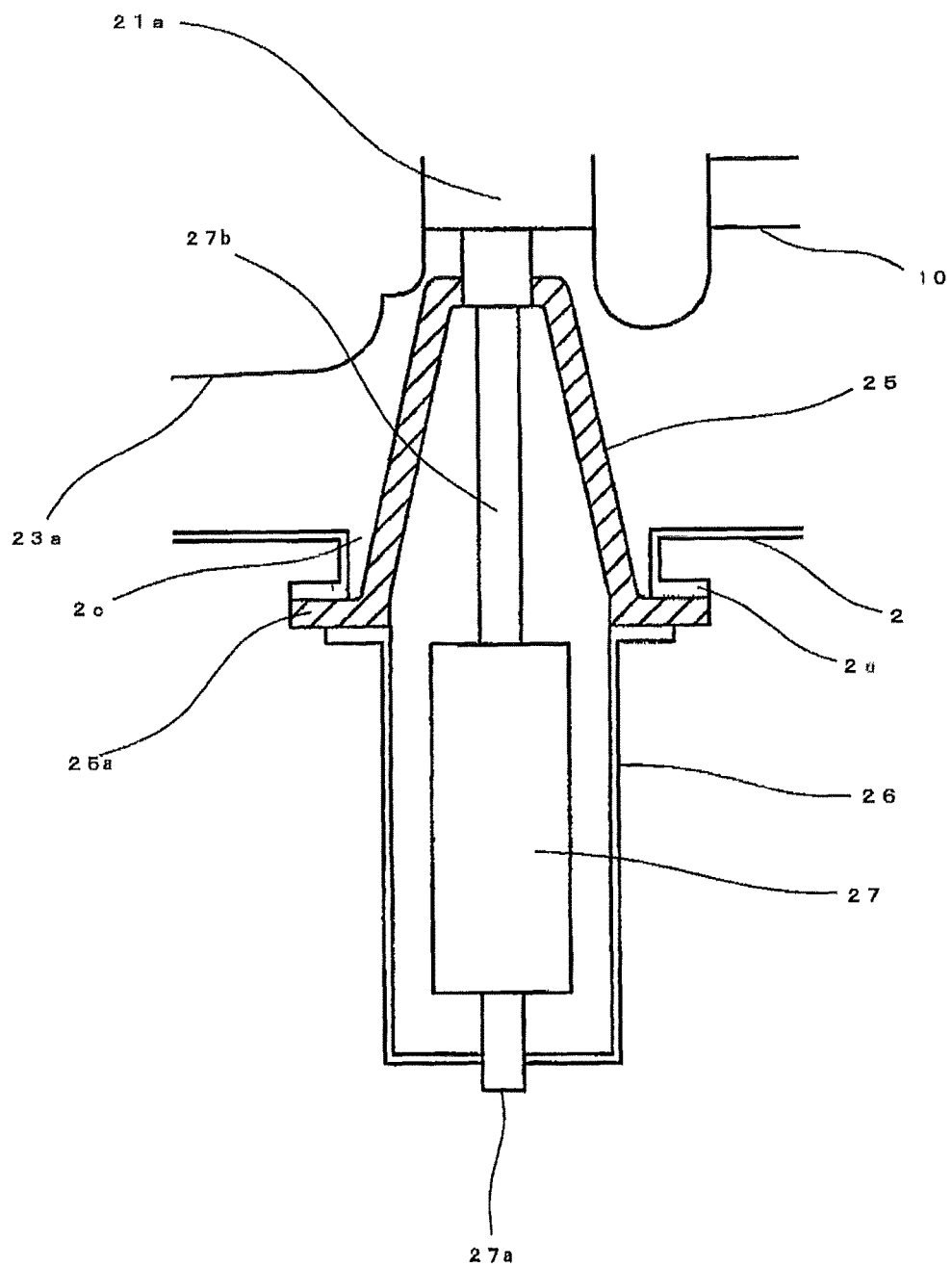
FIG. 2 is a sectional view showing a relevant part of the power switchgear according to Embodiment 1 of the present invention.

FIG. 2 is a sectional view showing a relevant part around the surge suppression apparatus 27 of FIG. 1. The conical shaped insulator 25 is placed by inserting its tip end portion from the opening portion 2c into the ground tank 2; and the opening portion 2c and an insulation flange 25a are hermetically connected. Then, the insulation cylinder 26 is hermetically attached to the outside of the power switchgear so as to cover the inside of a conical concave portion of the conical shaped insulator 25.

In this manner, the conical shaped insulator 25 and the insulation cylinder 26 are placed; and thus, gas is separated between the inside and the outside of the ground tank 2. A grounding side terminal 27a protruded from the surge suppression apparatus 27 to the lower side is fixed to a flange 2e provided on the opening portion 2c of the ground tank 2 via the insulation flange 25a to be electrically insulated from the ground tank 2. Incidentally, a main circuit side terminal 27b of the surge suppression apparatus 27 is connected to be capable of connecting to and separating from the main circuit of the vacuum switch tube 10, that is, a connection portion provided on the movable side connection conductor 21a.

In the surge suppression apparatus 27, the gas is separated between the inside and the outside of the ground tank 2 via the conical shaped insulator 25 and the insulation flange 25a and the insulating gas in the ground tank 2 is not leaked to the outside even when the surge suppression apparatus 27 is separated from the opening portion 2c. By this, recovery and refilling work of the insulating gas in the ground tank 2 is not required during replacement of the surge suppression apparatus 27, the only gas in the concave portion of the conical shaped insulator 25 is replaced; and therefore, quantity of replacement work of the insulation gas can be reduced.

Furthermore, the conical shaped insulator 25 intervenes; and thus, the insulation distance to be secured between the main circuit (for example, the movable side connection conductor 21a) of the power switchgear and the surge suppression apparatus 27 can be reduced. Besides, the surge suppression apparatus 27 is incorporated in the power switchgear; and thus, a placing space different from a placing space of the power switchgear does not need to be secured for placing the surge suppression apparatus 27, and only replacement of the insulation gas in the conical shaped insulator 25 is required in also the case of replacing the surge suppression apparatus 27; and therefore, an effect exists in that long shutdown is not required or the like.

In addition, the surge suppression apparatus 27 is attached from the lower side to the upper side of the ground tank 2 of the power switchgear; and thus, the surge suppression apparatus 27 can be configured not to protrude to a lateral portion of the power switchgear. Therefore, an inspection space of the power switchgear can be reduced.

Furthermore, in the opening portion 2c and the opening portion 2d provided on the lower side of both of the movable side connection conductor 21a and the fixed side connection conductor 21b, an attachable and detachable covering plate 28 is attached in a hermetical state in the opening portion 2d in which the surge suppression apparatus 27 is not attached. Thus, an adsorbent 29 which absorbs decomposed gas generated in the ground tank 2 and moisture in the insulation medium in the ground tank 2 can be placed in the opening portion 2d. In addition, the opening portion 2c and the opening portion 2d can be used as an inspecting opening of the inside of the apparatus, the inspecting opening being intended to inspect the movable side link conductor 100, the fixed side link conductor 101, the vacuum switch tube 10, and the like in the apparatus.

Embodiment 2

Figure 3:
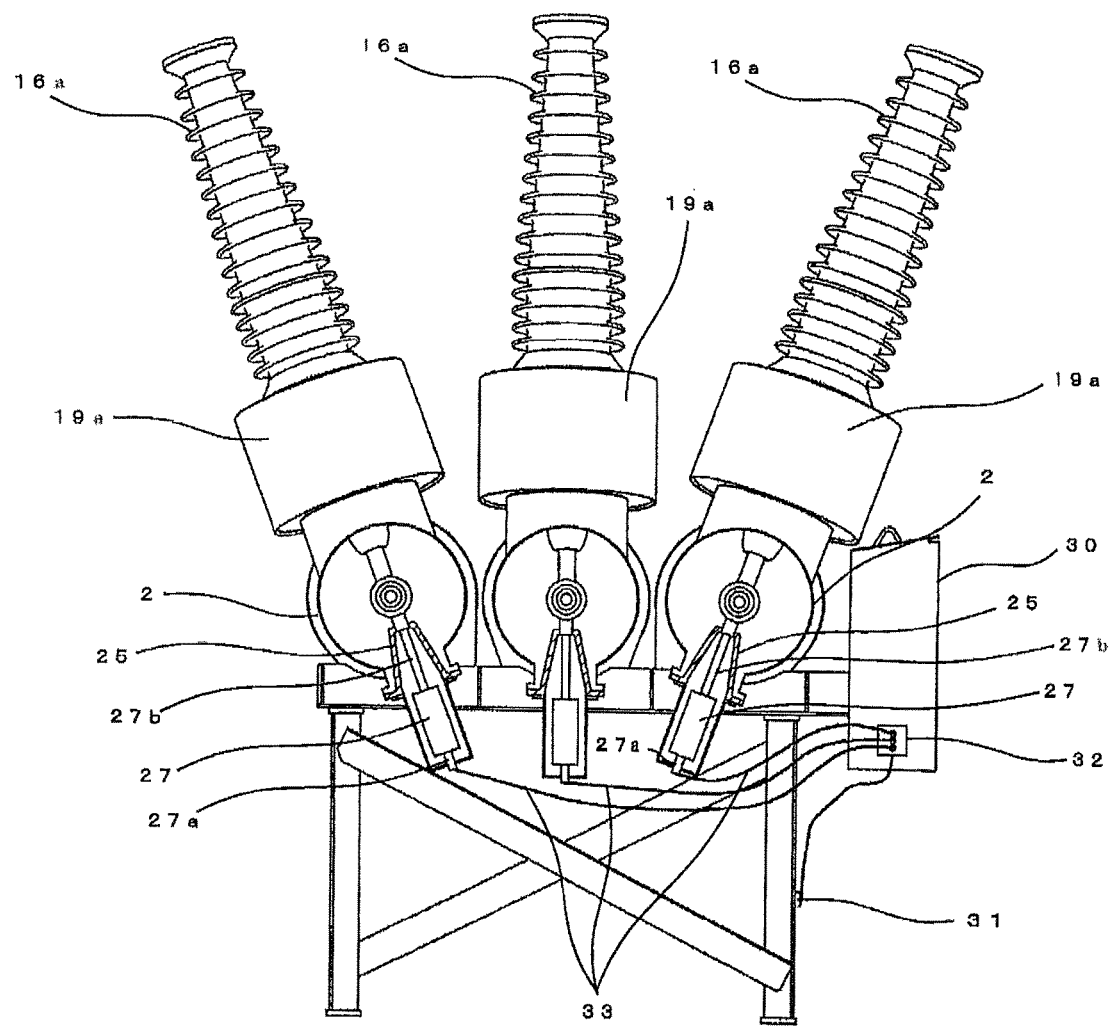
FIG. 3 is a front view showing, in a partial section, a power switchgear according to Embodiment 2 of the present invention.

Embodiment 2 of the present invention will be described with reference to FIG. 3. In the above-described power switchgear of Embodiment 1, an inspecting terminal 32 for inspecting a surge suppression apparatus 27 is placed near a control box 30 or near a grounding terminal 31 of the power switchgear.

A grounding wire 33 connected to the grounding side terminal 27a of the surge suppression apparatus 27 is individually connected for each phase to the inspecting terminal 32 placed near the control box 30. Then, a grounding wire 33 used in common for each phase is connected between from the inspecting terminal 32 to the grounding terminal 31 of the power switchgear.

In Embodiment 2, the grounding wire 33 from the grounding side terminal 27a of the surge suppression apparatus 27 of each phase is connected to the inspecting terminal 32 placed near the control box 30; and thus, the surge suppression apparatus 27 can be collectively controlled for each phase by the inspecting terminal 32. Furthermore, the grounding terminal 31 of the power switchgear and the inspecting terminal 32 are connected by the grounding wire 33 used in common for each phase; and thus, a reduction of the grounding wire and an improvement in attachment work efficiency of the grounding wire can be achieved.

Embodiment 3

Figure 4:
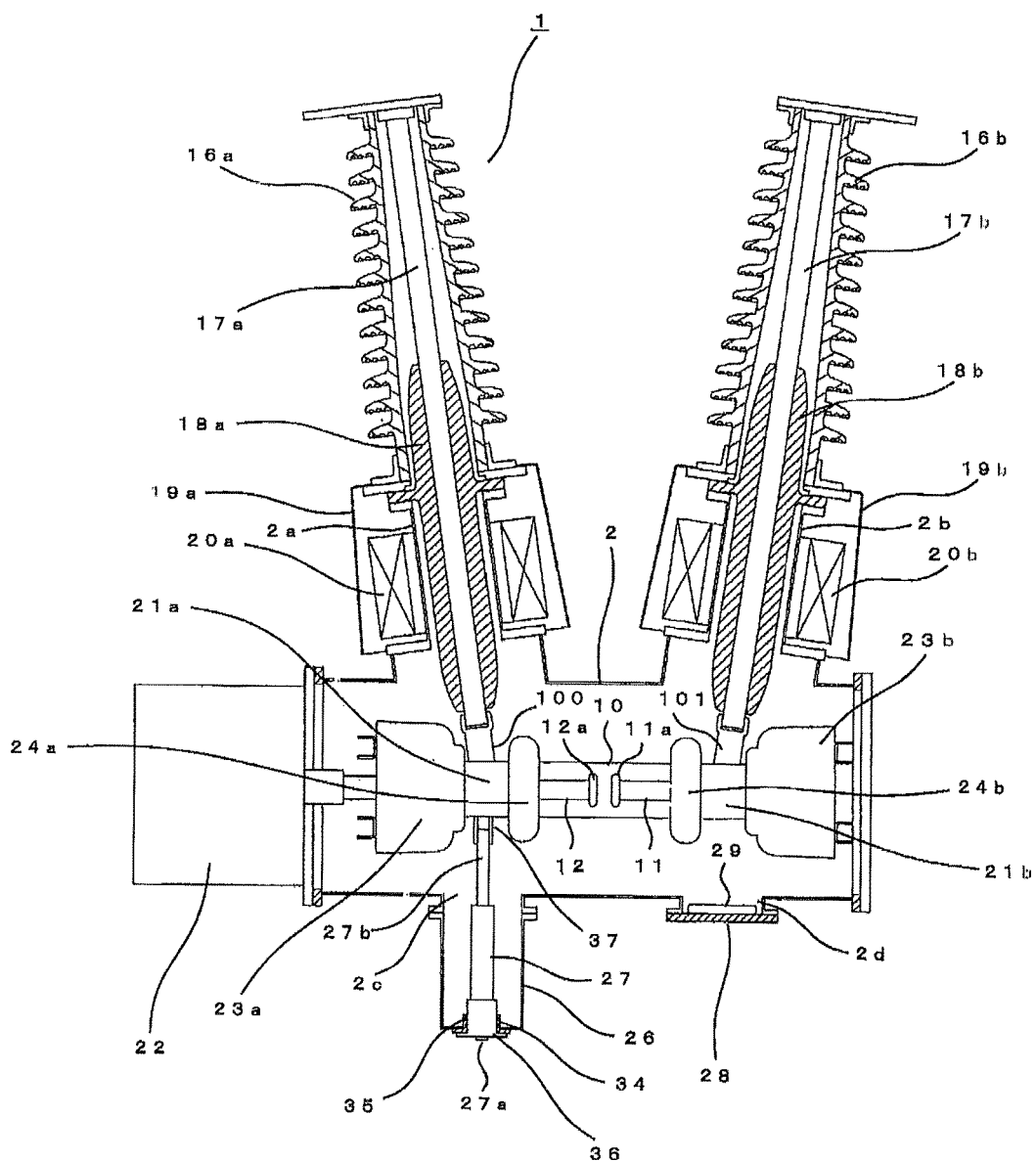
FIG. 4 is a sectional view showing a power switchgear according to Embodiment 3 of the present invention.
Figure 5:
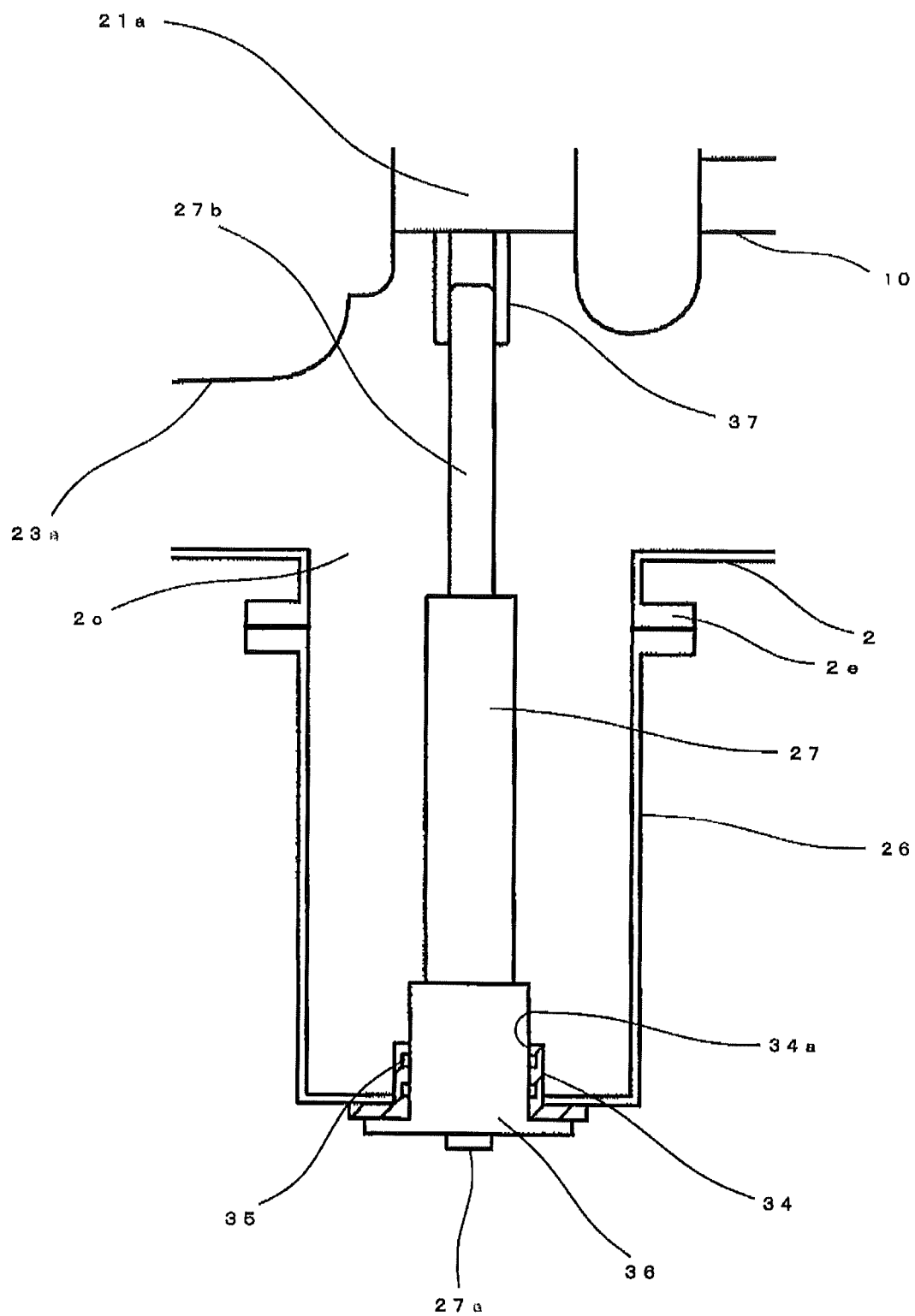
FIG. 5 is a sectional view showing a relevant part of the power switchgear according, to Embodiment 3 of the present invention.

Embodiment 3 of the present invention will be described with reference to FIG. 4 and FIG. 5. Then, in each of the drawings, identical or equivalent members and portions will be described with the same reference numerals assigned thereto. In the above-described Embodiment 1 and Embodiment 2, the surge suppression apparatus 27 is attachably and detachably fixed to the flange 2e of the opening portion 2c of the ground tank 2 with the hermetic seal. However, as shown in FIG. 4, a structure is made such that a gasket 35 which protrudes to the inner side than a through hole 34a of a slide seal case 34 fixed to an opening portion 2c of a ground tank 2 is provided in the inside of the through hole 34a of the slide seal case 34 and a slide seal shaft 36 having an outer diameter slightly smaller than the inner diameter of the through hole 34a of the slide seal case 34 is provided at a part of a grounding side terminal 27a of a surge suppression apparatus 27 so that the surge suppression apparatus 27 can be hermetically slid in the flange 2e of the opening portion 2c of the ground tank 2.

The structure is made such that the slide seal shaft 36 slides while pressing the gasket 35 protruded to the inner side than the through hole 34a of the slide seal case 34 in the outer circumferential direction thereof. A contactor 37 is provided at a tip end of a main circuit side terminal 27b of the surge suppression apparatus 27; and in a state where the surge suppression apparatus 27 is inserted in the main circuit side, the main circuit side terminal 27b of the surge suppression apparatus 27 is electrically connected to a main circuit of a power switchgear.

In Embodiment 3, the surge suppression apparatus 27 is hermetically slid by the slide seal case 34 and the slide seal shaft 36; and thus, the main circuit of the power switchgear and the main circuit side terminal 27b of the surge suppression apparatus 27 can be connected and separated without removing the surge suppression apparatus 27 from the opening portion 2c of the ground tank 2.

By this, when the main circuit side terminal 27b of the surge suppression apparatus 27 is temporarily connected to and separated from the main circuit of the power switchgear during withstand voltage test, work time can be shortened by reducing work in which the surge suppression apparatus 27 is removed from the opening portion 2c and is attached after testing.

By the way, in the above-described respective embodiments, the description has been made in the case where the opening portion 2c is provided on the lower side of the ground tank 2, but not limited to this; and the opening portion 2c may be provided on the lateral side of the ground tank 2 and similar effects to the above-described embodiments can be exhibited.

Incidentally, the present invention can freely combine the respective embodiments and appropriately change or omit the respective embodiments, within the scope of the present invention.

INDUSTRIAL APPLICABILITY

The present invention is suitable to actualize a power switchgear in which a placing space does not need to be secured differently for placing a surge suppression apparatus.

DESCRIPTION OF REFERENCE NUMERALS

1 Power switchgear, 2 Ground tank, 2c Opening portion, 2d Opening portion, 10 Vacuum switch tube, 16a Movable side insulator, 16b Fixed side insulator, 23a Movable side insulation supporter, 23b Fixed side insulation supporter, 25 Conical shaped insulator, 25a Insulation flange, 27 Surge suppression apparatus, 27a Grounding side terminal, 27b Main circuit side terminal, 32 Inspecting terminal, 33 Grounding wire, 34 Slide seal case, 35 Gasket, 36 Slide seal shaft, and 37 Contactor.

The invention claimed is:
1. A power switchgear comprising:
a ground tank having an axial direction that extends horizontally;
a vacuum switch tube horizontally placed in said ground tank and connected to an operating mechanism unit;
a movable side insulation supporter placed in said ground tank and supported by said ground tank to support a movable side of said vacuum switch tube;
a fixed side insulation supporter placed in said ground tank and supported by said ground tank to support a fixed side of said vacuum switch tube;
a movable side center conductor having one end that passes through a wall portion of said ground tank and that is connected to the movable side of said vacuum switch tube, and having an opposite end that extends beyond an upper side of said ground tank and inside of a movable side insulator; and
a fixed side center conductor having one end that passes through a second wall portion of said ground tank and that is connected to the fixed side of said vacuum switch tube, and having an opposite end that extends beyond the upper side of said ground tank and inside of a fixed side insulator,
said power switchgear including:
a conical shaped insulator which is placed on an opening portion at a part of said ground tank, and having a tip end portion inserted in said ground tank;
an insulation cylinder which is placed at a rear end portion of said conical shaped insulator to cover an inside of a conical concave portion of said conical shaped insulator, and protrudes outside of said ground tank; and
a surge suppression apparatus that is placed inside said insulation cylinder while maintaining hermetic seal, and that has a main circuit side terminal placed in said conical shaped insulator, and said main circuit side terminal is connected to a main circuit of said vacuum switch tube, said surge suppression apparatus being placed on a lower side or a lateral side of said ground tank.

2. A power switchgear comprising:
a ground tank having an axial direction that extends horizontally;
a vacuum switch tube horizontally placed in said ground tank and connected to an operating mechanism unit;
a movable side insulation supporter placed in said ground tank and supported by said ground tank to support a movable side of said vacuum switch tube;
a fixed side insulation supporter placed in said ground tank and supported by said ground tank to support a fixed side of said vacuum switch tube;
a movable side center conductor having one end that passes through a wall portion of said ground tank and that is connected to the movable side of said vacuum switch tube, and having an opposite end that extends beyond an upper side of said ground tank and inside of a movable side insulator; and
a fixed side center conductor having one end that passes through a second wall portion of said ground tank and that is connected to the fixed side of said vacuum switch tube, and having an opposite end that extends beyond the upper side of said ground tank and inside of a fixed side insulator,
said power switchgear including:
an insulation cylinder which is placed on an opening portion at a part of said ground tank, and which protrudes outside of said ground tank;
a surge suppression apparatus that is placed inside said insulation cylinder while maintaining hermetic seal, and that has a main circuit side terminal placed inside said ground tank and said main circuit side terminal is connected to a main circuit of said vacuum switch tube;
a contactor which is placed on a main circuit side of said vacuum switch tube, and is brought into contact with said main circuit side terminal of said surge suppression apparatus;

a slide seal shaft placed on an outer circumferential portion of a grounding side terminal of said surge suppression apparatus; and a slide seal case which is placed on said insulation cylinder, and through which said slide seal shaft is passed through, said surge suppression apparatus being placed on a lower side or a lateral side of said ground tank.

3. The power switchgear according to claim 1, wherein a terminal of said surge suppression apparatus is connected to an inspecting terminal by a grounding wire.

4. The power switchgear according to claim 2, wherein a terminal of said surge suppression apparatus is connected to an inspecting terminal by a grounding wire.

5. The power switchgear according to claim 2, wherein said surge suppression apparatus is configured to slide in said ground tank while maintaining said hermetic seal, and said surge suppression apparatus and said main circuit are configured to be connected and separated.

* * * * *